(12) United States Patent
Lu

(10) Patent No.: US 6,197,177 B1
(45) Date of Patent: *Mar. 6, 2001

(54) WATER TREATING APPARATUS WITH ELECTRO-CHEMISTRY PROCESS

(75) Inventor: Fang Chung Lu, Chong Ho (TW)

(73) Assignee: Silkroad Corp., Taipei Hsien (TW); a part interest (*) Notice: Subject to any disclaimer, the term of this patent is extended or adjusted under 35 U.S.C. 154(b) by 0 days.

This patent is subject to a terminal disclaimer.

(21) Appl. No.: 09/435,887

(22) Filed: Nov. 6, 1999

(51) Int. Cl.$^7$ .................................................. B03C 5/02
(52) U.S. Cl. .......................... 204/671; 204/554; 204/753
(58) Field of Search .................................... 204/660, 671, 204/670, 554; 205/753

(56) References Cited

U.S. PATENT DOCUMENTS

| 3,616,356 | * | 10/1971 | Roy | 204/152 |
| 4,004,994 | * | 1/1977 | Andrus | 204/149 |
| 4,048,030 | * | 9/1977 | Miller | 204/149 |

* cited by examiner

*Primary Examiner*—Kathryn Gorgos
*Assistant Examiner*—Thomas H Parsons

(57) ABSTRACT

One or more water treating devices each includes a housing for receiving a number of electric conductive particles and one or more electrodes for electrifying the particles. The waste water to be treated is introduced into the housing and flows through the particles when the particles are electrified for allowing the particles to treat the water. The particles, after use, may be discharged from the housing so as to be cleaned. The water treating devices may be arranged in series or in parallel or in both series and parallel.

7 Claims, 6 Drawing Sheets

WATER TREATING APPARATUS WITH ELECTRO-CHEMISTRY PROCESS

BACKGROUND OF THE INVENTION

1. Field of the Invention

The present invention relates to a water treating apparatus, and more particularly to a water treating apparatus using electro-chemistry processes.

2. Description of the Prior Art

Typical water treating devices comprise a number of filtering stations for filtering the waste water, and a number of treating stations for treating the waste water by chemical materials or by chemical processes. It takes a long time and a number of stations to filter and to treat the waste water before the treated water may be used again.

The present invention has arisen to mitigate and/or obviate the afore-described disadvantages of the conventional water treating devices.

SUMMARY OF THE INVENTION

The primary objective of the present invention is to provide a water treating apparatus for effectively treating the waste water with electro-chemistry processes.

In accordance with one aspect of the invention, there is provided a water treating apparatus comprising at least one water treating device including a housing having a chamber formed therein and having a lower portion and an upper portion, the housing including an entrance for receiving water to be treated and including an exit for discharging the treated water, a plurality of electric conductive particles disposed in the chamber of the housing, and means for electrifying the particles to treat the water.

The electrifying means includes at least one electrode secured in the housing, and means for energizing the electrode. The housing includes at least one barrel secured therein for receiving the electrode. The barrel includes a cap secured thereto for securing the electrode in the barrel. The barrel includes a plurality of openings formed therein for allowing the water to flow into the barrel and to flow through the electrode.

A device is further provided for cleaning the particles after the particles are discharged from the housing. A device is further provided for supplying the particles into the chamber of the housing. A device is further provided for introducing the water into the housing. A container is further coupled to the housing for receiving the water after being treated.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
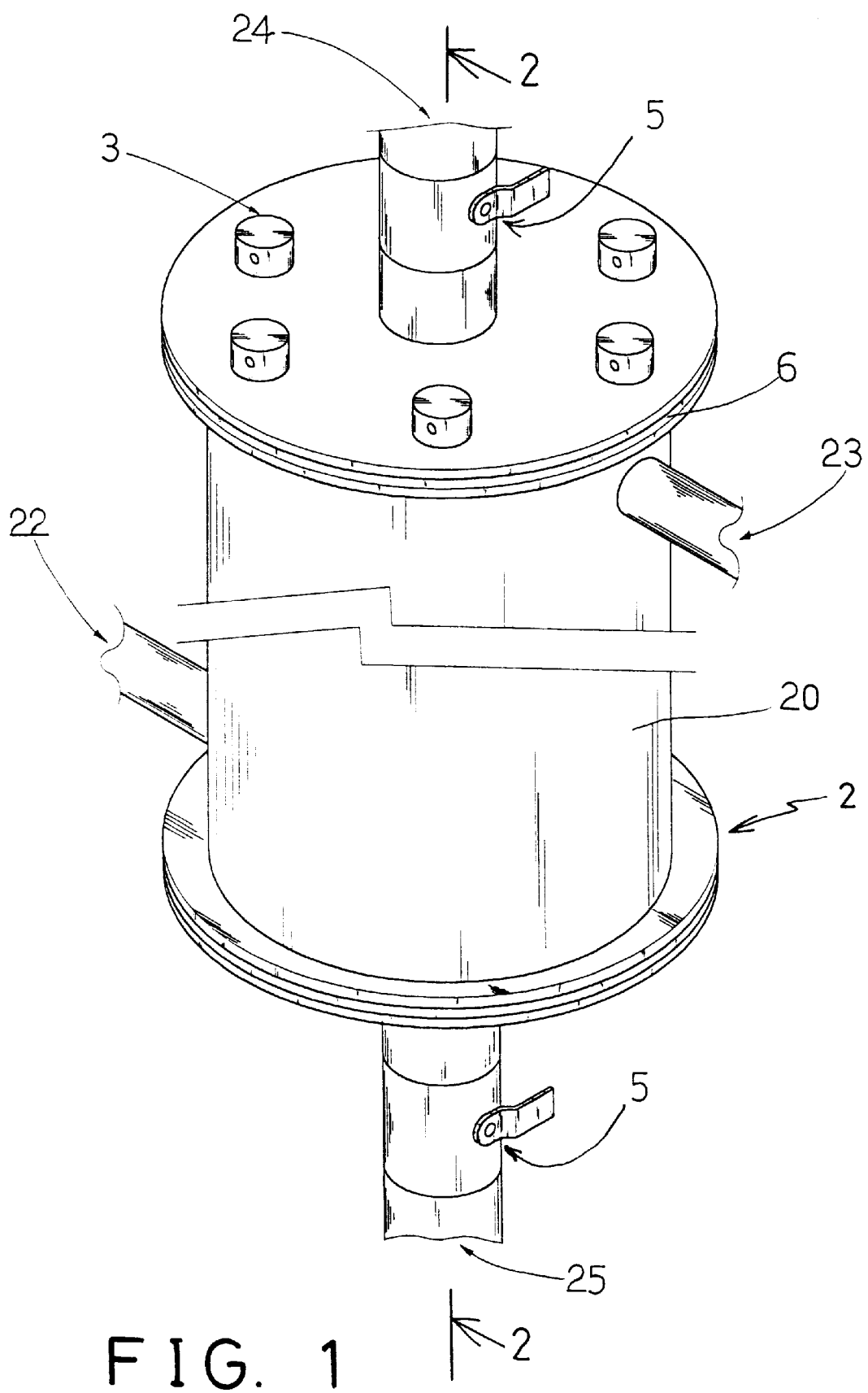
FIG. 1 is a perspective view of a water treating device in accordance with the present invention.
Figure 2:
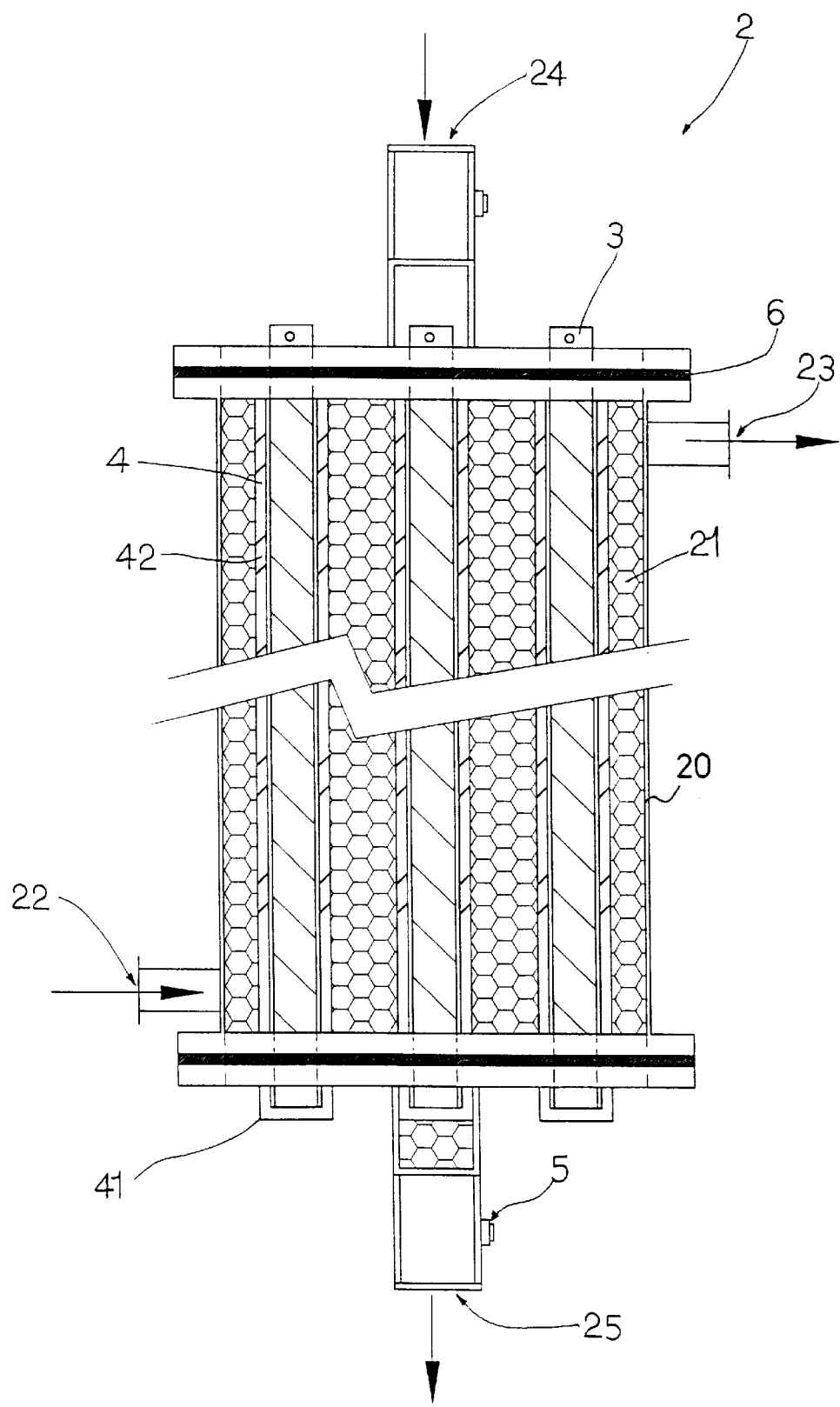
FIG. 2 is a cross sectional view of the water treating device, taken along lines 2—2 of FIG. 1.
Figure 3:
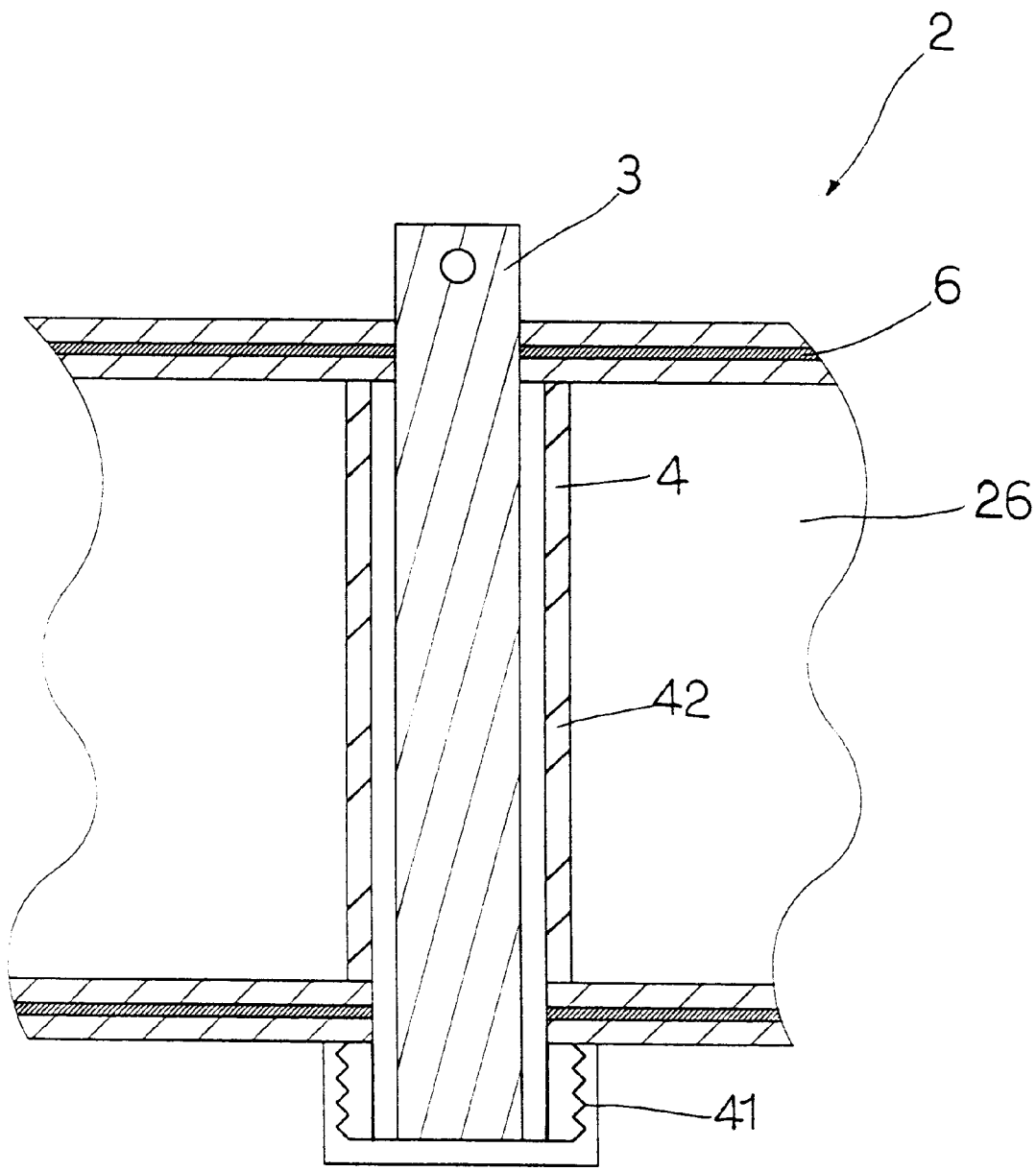
FIG. 3 is an enlarged partial cross sectional view of the water treating device.
Figure 5:
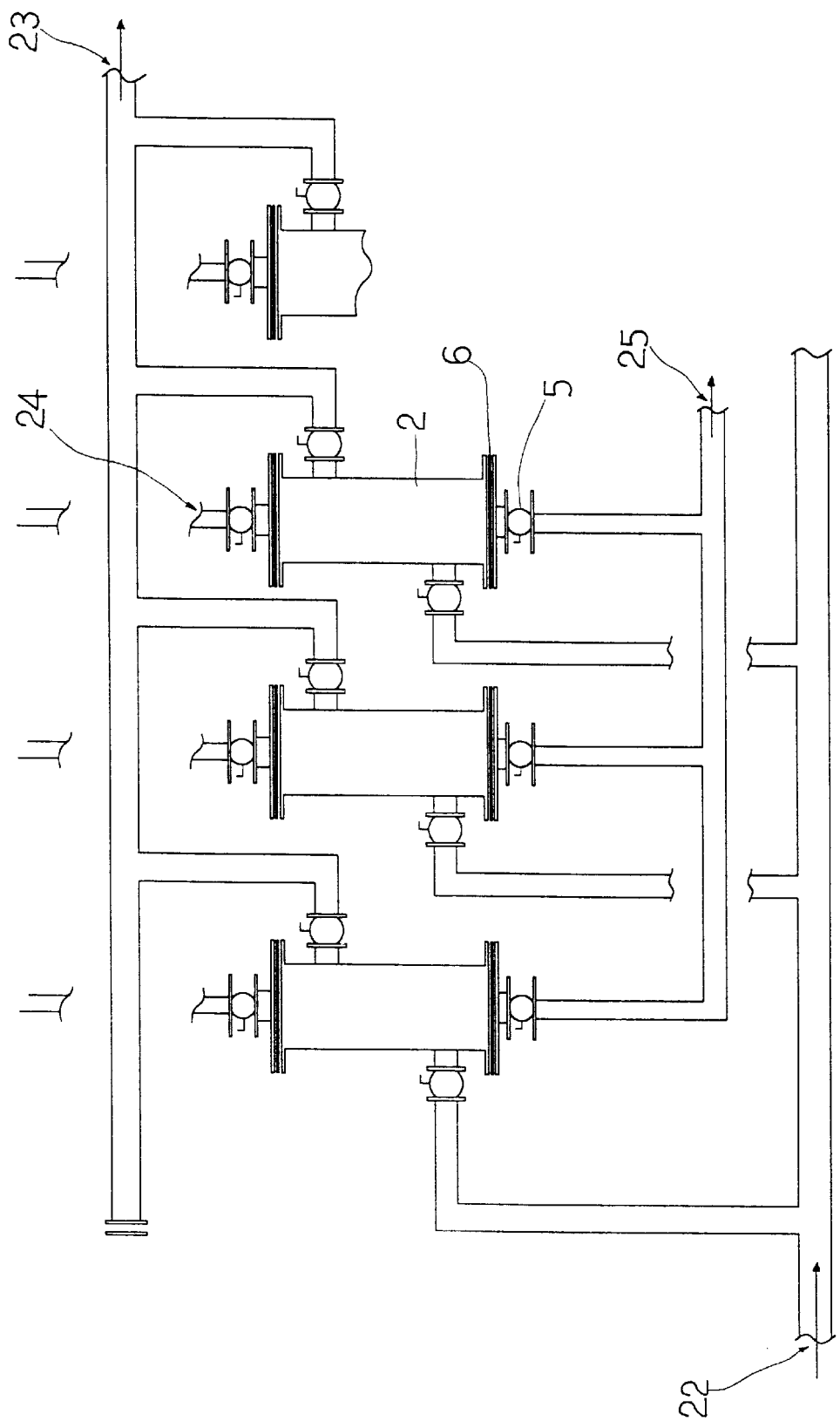
FIG. 5 is a partial plane view illustrating the arrangement of the water treating devices of a water treating apparatus.

Referring to the drawings, and initially to FIGS. 1 and 2, a water treating apparatus in accordance with the invention comprises one or more water treating devices 2 which may be assembled together in series or in parallel to each other (FIG. 5) or in both series and parallel arrangement. One of the water treating devices 2 is shown in FIGS. 1–3, and includes a housing 20 which preferably includes two filter screens secured on the upper and the lower portion thereof, and which includes a chamber 26 (FIG. 3) defined therein for receiving a number of particles 21. The housing 20 includes an inlet 24 provided in the upper portion for filling the particles 21 into the housing 20, and includes an outlet 25 provided in the lower portion for allowing the particles 21 to be easily and quickly discharged out through the outlet 25 and for changing the particles 21. The size of the housing 20 and the volume or the number of the particles 21 may be selected or may be made according to the water quantity to be treated. The upper and the lower portions of the housing 20 each preferably includes a sealing ring or a gasket 6 secured therein for making a water tight seal therein.

The housing 20 further includes an entrance 22 formed in the lower portion thereof for receiving the waste water to be treated and for allowing the waste water to flow into the housing 20 and to flow through the particles 21. The housing 20 includes an exit 23 formed in the upper portion thereof for discharging the treated water. The inlet 24, the outlet 25, the entrance 22, and the exit 23 may each includes a valve 5, such as an electro-magnetic valve, for controlling the water and the particles 21 to flow into and out of the housing 20. The valves 5 may be coupled to a computer or a microprocessor for allowing the valves 5 to be controlled automatically by the microprocessor. The valves 5 may also be operated manually.

Figure 4:
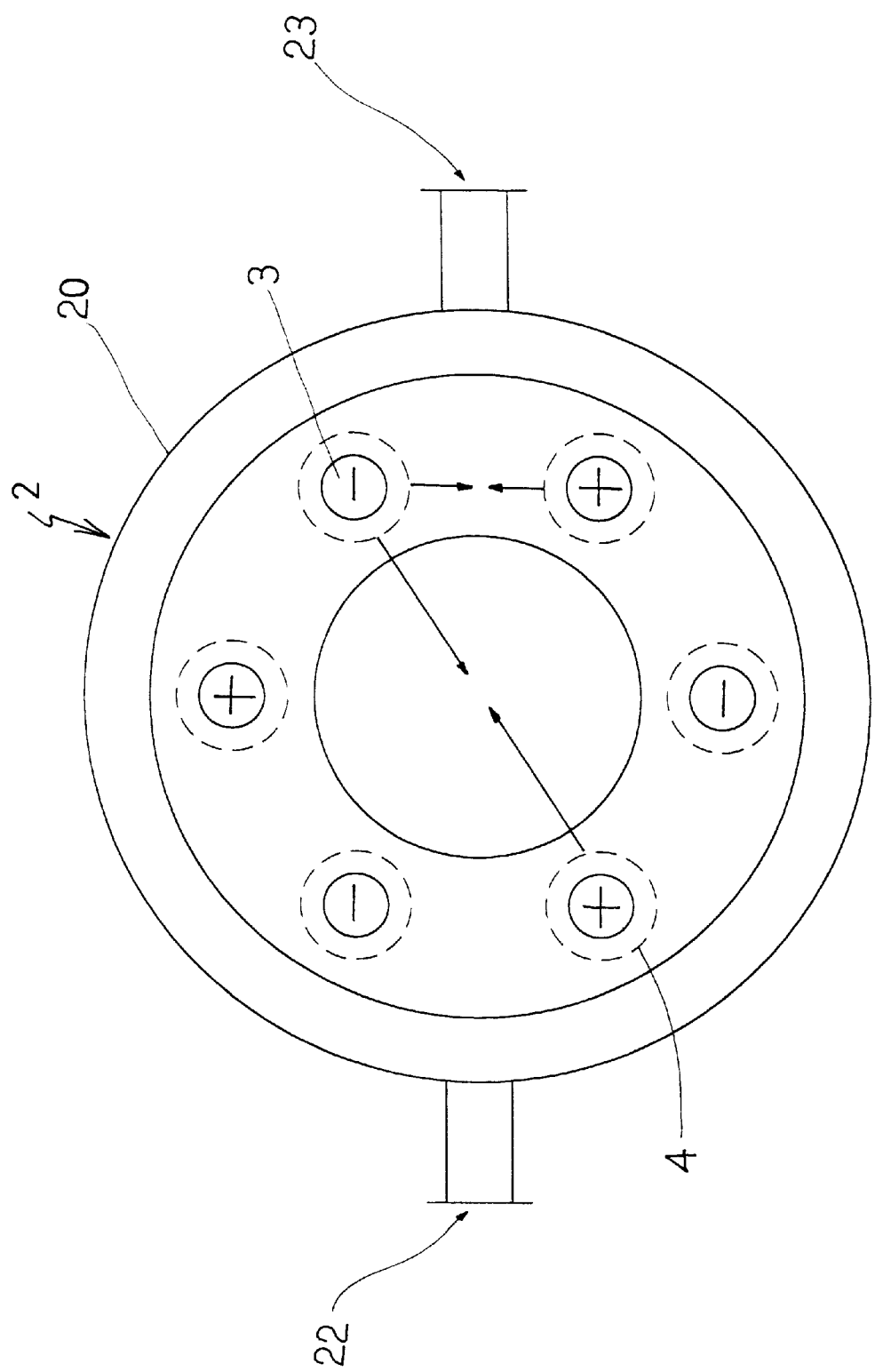
FIG. 4 is a schematic view illustrating the operation of the water treating device.

One or more electrodes 3 is disposed in the housing 20 and preferably arranged in a circle within the housing 20 and spaced away from each other. One or more electric insulated barrels 4 are disposed in the housing 20 for receiving the electrodes 3 respectively and for preventing the electrodes 3 from contacting with the particles 21 and for preventing the electrodes 3 from being short-circuited. The barrels 4 each includes a number of openings 42 formed therein for allowing the water to flow through the electrodes 3. The electrodes 3 are preferably made of such as steel, graphite, etc., and are coupled to the electrodes of a power supply, such as a battery 45 (FIG. 6), which may energize or may supply the electricity to the particles 21 or which may electrify the particles 21 (FIG. 4), by supplying the electric field and/or the electric current through the electrodes 3 and the particles 21. The particles 21 may be of any shape, particularly a spherical shape, and are made of electric conductive materials, such as metal, aluminum, lead or magnesium, etc., such that the particles 21 may be electrified. The barrels 4 each includes a cap 41 threaded to the lower portion thereof for allowing the electrodes 3 to be easily engaged into the barrels 4 and for securing the electrodes 3 in the barrels 4 respectively.

In operation, the waste water flowing through the electrodes 3, and the particles 21 may be subjected an oxidation treatment, and/or an electrolytic action, and/or an electronation treatment, and/or a neutralization treatment, and/or a corrosive action when the electrodes 3 and the particles 21 are energized. Oxygen and hydrogen may be generated and may be attached to the small particles or the dirt in the water and may move the dirt upward for allowing the dirt to be removed. The NaCl contained in the water may be electrolyzed into OCl⁻ or HOCl— which may spoil the contaminant contained in the water.

Figure 6:
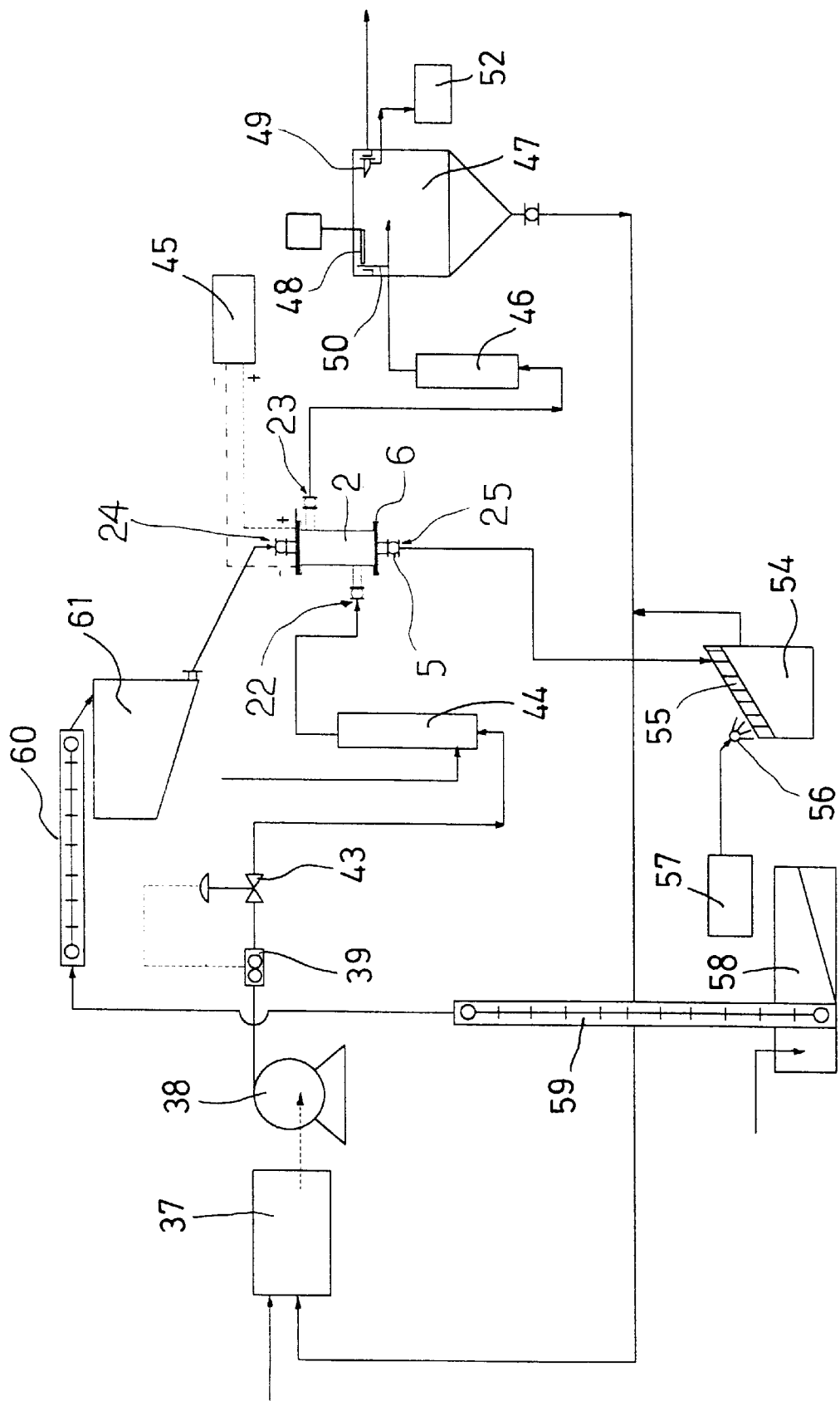
FIG. 6 is a schematic view illustrating the water treating apparatus having the water treating device.

Referring next to FIG. 6, illustrated is a complete water treating apparatus having one water treating device 2 for treating water. The water treating apparatus may include one or more water treating devices 2 arranged in series or arranged in parallel to each other (FIG. 5) or in both series and parallel arrangement. The complete water treating apparatus includes a reservoir 37 for receiving the waste water to be treated. A pump 38 may be used for pumping the water received in the reservoir 37 into the housings 20 of the water treating devices via a flow meter 39 and/or a flow control valve 43 and a flow mixer 44. A clean water supply or the like may be introduced into the flow mixer 44 for adjusting the pH value of the water and for preventing the pH value from becoming too low or too high. The water may become corrosive and may damage the elements when the pH value of the water is too low or too high. The electrodes 3 and the particles 21 may be energized by the battery 45 to treat the waste water. The treated water may flow into a container 47 via another flow mixer 46. The oxygen and the hydrogen generated in the housing 20 of the water treating device may move the dirt and the contaminant upward. The coagulating agent, for example, may be introduced into the water at the flow mixer 46 for coagulating the dirt. A remover device 48 may sweep and may move the coagulated dirt to a collector receptacle 52 via a collector chute 49. A partition or a screen 50 may further be disposed in the container 47 for separating the coagulated dirt from the treated water for allowing the treated water to be pumped out for further use by a motor or a pump.

The particles 21 may be corroded after use, and the dirt and/or the contaminant particles may be accumulated between the particles 21, such that the particles 21 are required to be periodically cleaned and/or replaced with the cleaned or new particles 21. A cleaner device 54 includes a screen 55 or the like disposed on top for receiving and collecting the particles 21 discharged from the outlet 25 of the water treating devices 2 and a nozzle 56 may supply a pressurized water from a water reservoir 57 to clean the particles 21. A tank 58 may be provided for receiving and collecting the cleaned particles 21. One or more elevators or supplier devices 59, 60 may further be provided for moving the cleaned particles 21 into a box 61 for allowing the cleaned particles 21 to be introduced into the housing 20 of the water treating device again.

Accordingly, the water treating apparatus in accordance with the present invention includes one or more water treating devices for effectively treating the waste water with the electrochemistry processes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A water treating apparatus comprising:
at least one water treating device including:
a) a housing having a chamber formed therein and having a lower portion and an upper portion, said housing including an entrance for receiving water to be treated and including an exit for discharging the water, said housing including an inlet coupled to said upper portion of said housing and an outlet coupled to said lower portion of said housing,
b) a plurality of electric conductive particles disposed in said chamber of said housing via said inlet of said housing, and dischargeable from said housing via said outlet of said housing,
c) means for electrifying said particles to treat the water, said electrifying means including:
i) at least one electrode secured in said housing, and
ii) means for energizing said at least one electrode,
d) at least one barrel secured in said housing for receiving said at least one electrode.

2. The water treating apparatus according to claim 1, wherein said at least one barrel includes a cap secured thereto for securing said at least one electrode in said at least one barrel.

3. The water treating apparatus according to claim 1, wherein said at least one barrel includes a plurality of openings formed therein for allowing the water to flow into said at least one barrel and to flow through said at least one electrode.

4. The water treating apparatus according to claim 1 further comprising means for cleaning said particles after said particles are discharged from said housing.

5. The water treating apparatus according to claim 1 further comprising means for supplying said particles into said chamber of said housing.

6. The water treating apparatus according to claim 1 further comprising means for introducing the water into said housing.

7. The water treating apparatus according to claim 1 further comprising a container coupled to said housing for receiving the water after being treated.

* * * * *